March 11, 1952     D. W. BARKLEY     2,588,792
ADJUSTABLE MOUNTING FOR AUTOMOBILE REARVIEW MIRRORS Filed Nov. 26, 1947     2 SHEETS—SHEET 1

INVENTOR.
Dwight W. Barkley
BY
Nobbe & Swope
ATTORNEYS

March 11, 1952  D. W. BARKLEY  2,588,792
ADJUSTABLE MOUNTING FOR AUTOMOBILE REARVIEW MIRRORS
Filed Nov. 26, 1947  2 SHEETS—SHEET 2
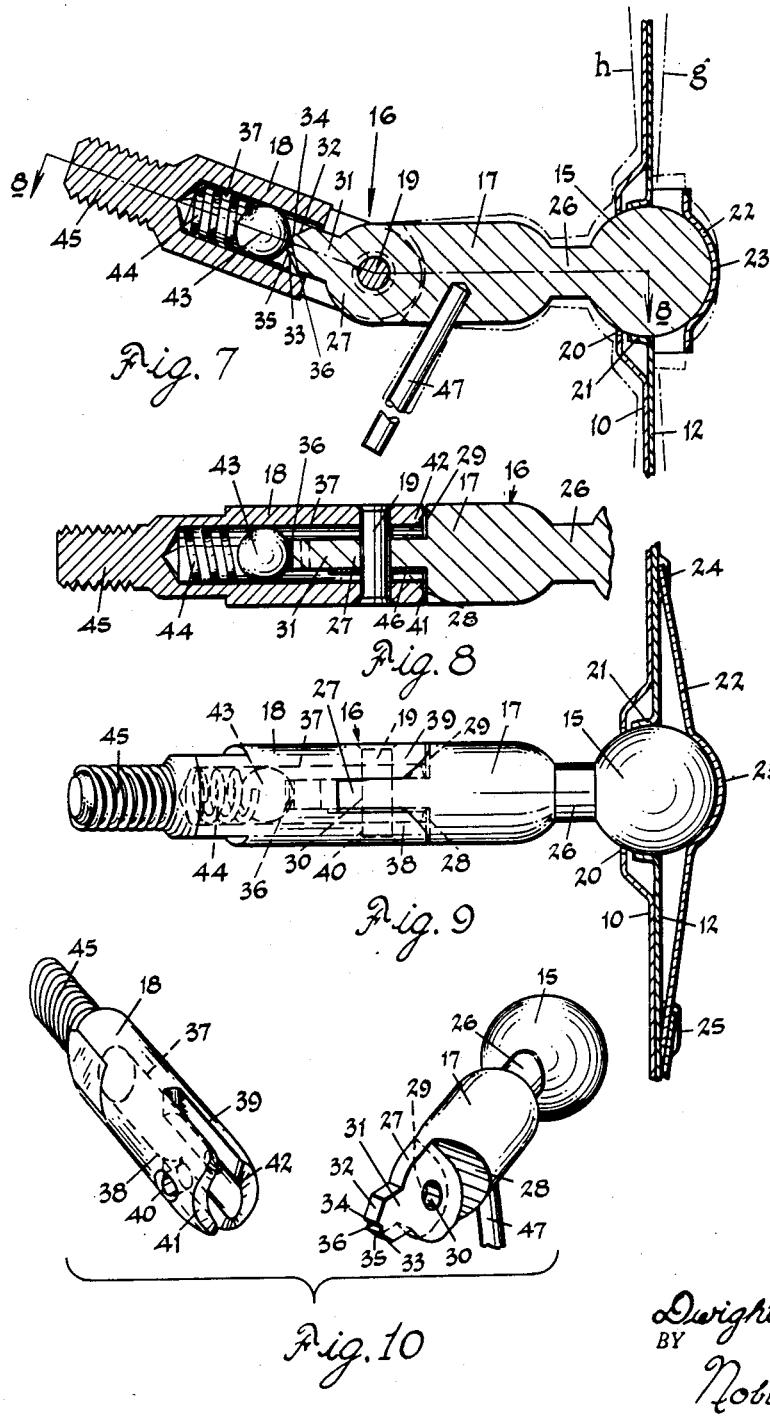
INVENTOR.
Dwight W. Barkley
BY
Nobbe & Swope
ATTORNEYS Patented Mar. 11, 1952

2,588,792

UNITED STATES PATENT OFFICE 2,588,792

ADJUSTABLE MOUNTING FOR AUTOMOBILE REARVIEW MIRRORS

Dwight Wilson Barkley, Cheswick, Pa., assignor to Libbey-Owens-Ford Glass Company, Toledo, Ohio, a corporation of Ohio Application November 26, 1947, Serial No. 788,119

3 Claims. (Cl. 88—98)

My invention relates to improvements in rear view mirrors which are used in automobiles and more particularly to the mounting thereof.

The primary purpose in the use of a rear view automobile mirror is of course to provide the driver with a satisfactory view of the rear road under the various conditions of driving. Heretofore, rear view mirrors have had to be designed with reflectivities which gave a reasonably acceptable compromise for most drivers between glare elimination and visibility. Thus, lead sulfide mirrors, having a reflectivity of about 30% and which represent by far the greatest number of rear view mirrors in use today, are objected to by many drivers as producing intolerable glare in night driving, while many others consider their reflectivity as too low for day driving.

For day driving a reflectivity of over 30%, preferably in the range of 40% to 60%, is quite useful. For night driving, however, lower reflectivities are necessary to prevent glare. A mirror of reflectivity between approximately 10% and 30%, preferably between 18% and 22%, has been found to provide ideal glare removal while providing excellent rear road visibility for most drivers. The provision of a mirror for night driving with a single fixed reflectivity in this range, as in prior used rear view automobile mirrors, has represented a compromise which has been unsuitable for many drivers due to the great variation in the ability of human eyes to withstand glare and in the ability to see at various light intensities. It has also been unsuitable for preventing glare from extremely high light intensity conditions.

A mirror providing a choice of two reflections of approximately 75% for day driving and approximately 4.25% for night driving has been liked by many drivers for the increased daytime reflectivity except in sun and snow glare conditions. However, it has been generally found that the approximately 4.25% reflectivity available for night driving while removing glare has been of little use since seeing ability was simultaneously removed.

In my copending application filed of even date herewith, Serial No. 788,120, I have disclosed and claimed an improved type of prismatic rear view mirror device which provides the automobile driver with a personal selection of three of more intensities of images of the rear road conditions. Such a mirror permits the driver to make a choice of the images of various brightness, each image being of the common limited rear field of view so as to obtain maximum visibility with the minimum glare best suited to his particular personal eye glare tolerance and visual acuity under all the varying light intensities present under modern night and day driving conditions.

The mirror device, which is the subject of my copending application, provides for abnormal driving conditions and for the wide variations in eye sensation of automobile drivers by providing at least three images of the rear road conditions which the driver may select as the rear lighting conditions and his eye sensitivity to glare and visibility vary. The choice of image intensity suitable to the driver is made by his selectively positioning the prismatic rear view mirror by angular adjustment to alternately locate the various images of differing intensities of the same limited common field of rear view in the normal line of sight of the driver as he sits in driving position in the car. Thus, the rear view mirror may provide a choice of at least three image intensities which may be, for example, of over 30%, between 10% and 30% approximately, and of over 4.5% up to 12% approximately of the incident light falling upon the rear view mirror and coming from the rear view of the road, etc.

This invention is primarily concerned with the mounting of the improved mirror of my copending application and has for its primary object the provision of a mounting by which the mirror may be angularly adjusted to predetermined positions to selectively locate any one of three different image intensities of the same limited common field of view in the normal line of sight of the driver.

Another object of this invention is the provision of such a mounting for a rear view mirror embodying simple yet effective means by which the driver may angularly adjust the mirror to predetermined positions at will to selectively locate in the predetermined position of the driver's eyes the first, second and third images of the common rear field view.

Another object of the invention is the provision of such a mounting so constructed that the rear view mirror can be readily and conveniently tilted upwardly or downwardly by the driver within a controlled arc to bring any one of the three images of various intensities into the line of vision of the driver and including means for insuring maintenance of the mirror in selected position.

A further object of the invention is the provision of a mounting for a rear view mirror embodying means enabling tilting movement of the mirror to any one of three positions by finger tip control to give the desired intensity of image and for effectively locking the mirror in selected position.

A still further object of the invention is the provision of spring actuated locking means for effectively retaining the mirror in predetermined adjusted position while permitting it to be easily and quickly shifted to another position with a minimum of effort and attention and without disturbing the adjustment of the mirror in relation to the driver.

Other objects and advantages of the invention will become more apparent during the course of the following description, when taken in connection with the accompanying drawings.

In the drawings wherein like numerals are employed to designate like parts throughout the same:

Fig. 7 is a longitudinal section view through the mirror mounting taken in a vertical plane;

Fig. 8 is a longitudinal horizontal section taken substantially on line 8—8 of Fig. 7;

Fig. 9 is a plan view of the mirror mounting; and

Fig. 10 is a perspective view of the two main parts of the mounting.

As explained in detail in my above-noted copending application, the mirror comprises at least two mirror reflecting surfaces or reflective means associated with each other and arranged, on behind the other, with either their lower or upper edges in converging relationship and with the other edges more widely spaced apart. Thus, the mirror reflective means or coatings deposited upon front and rear supporting surfaces are arranged in a non-parallel relationship to provide a prism or a support of prism form. As a suitable support for the mirror reflective means or coatings, I may employ transparent bodies such as glass or plastic prisms or sheets of the same arranged in prism forms, the sheets being held in close and fixed or fastened angular relationship by a frame.

The angle between the two mirror reflective means or coatings, which form a front and a rear mirror disposed at such angle to each other, is preferably of the order of three and one-fourth degrees, although there may readily be used an angular separation between the two mirrors of from two to ten degrees or more. The smaller angular separations are preferable where solid prism supports are employed and the larger angular separations of close to ten degrees are preferable and give somewhat more convenient operation when a prism form composed of glass sheets is used.

Figure 1:
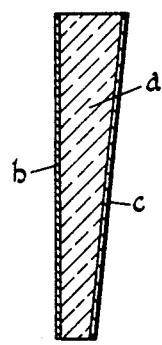
Fig. 1 is a vertical sectional view through a mirror made from a wedge shaped piece of glass.

By way of example, the mirror in Fig. 1 consists of a support of glass or other transparent material $a$ which is wedge shaped in vertical cross section. The back surface of the support $a$ carries a highly reflective mirror film means $b$ which, as a coating on a plane sheet of glass, would have a reflectivity preferably ranging from 50% to 95% or more. The front surface of this support carries a mirror reflective film means $c$.

The front reflective film means $c$ is semi-transparent and of substantially no light absorption. It may be of a reflectivity of 10% to 30% and in such cases might be used in normal night driving and in daytime driving under snow and sun glare conditions. Or, the front reflective film means may be of higher reflectivity of up to an approximate maximum of 70%, in which case this front mirror of 30% to 70% substantially will be employed largely as a day driving mirror. The rear reflective film means $b$ is preferably opaque, although it may also be semi-transparent, but if so preferably of less transparency than film means $c$. If the film means $b$ is transparent, it may or may not be backed with an opaque coating.

Figure 2:
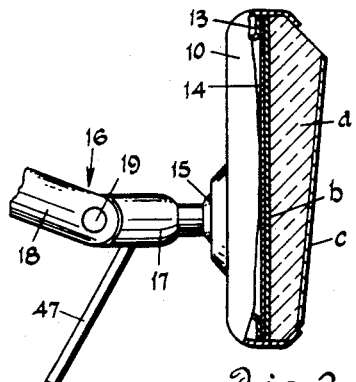
Fig. 2 is a similar view showing the mirror mounted in a frame and carried by the mounting means provided by this invention.

According to this invention, the mirror of Fig. 1 is carried by a metal backing plate or case 10 having an open side in which the mirror is arranged and held against forward displacement by the peripheral flange 11 of said case which is bent over the edges of the mirror as best shown in Fig. 2. To hold the mirror against rearward displacement, there is arranged within the case 10 a metal liner plate 12, the flanged peripheral edge 13 of which engages the back of the mirror. If desired, a protective sheet or layer 14 of paper or other suitable material can be interposed between the back of the mirror and the liner plate.

To provide for mounting the mirror in a vehicle so that it may be adjusted to properly position it for different drivers, it is carried on the truncated ball 15 of the special tiltable mounting designated in its entirety by the numeral 16, said mounting comprising generally the two arms 17 and 18 pivotally connected together at their adjacent ends by a horizontal pivot pin 19. By means of the mounting 16, a step by step angular adjustment of the mirror either upwardly or downwardly may be secured when the mirror is supported as shown in Fig. 3 in a suitable position in the automobile as will be more fully hereinafter described.

Figure 3:
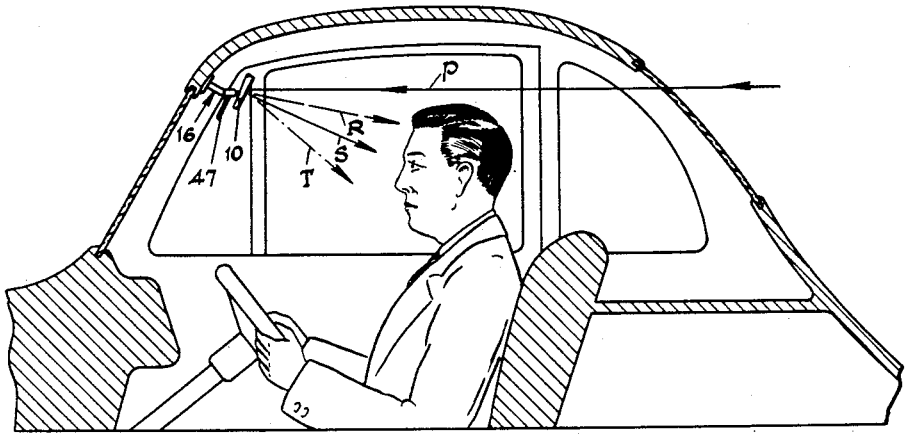
Fig. 3 is a diagrammatic view showing how the mirror is used in an automobile.

This stepwise angular adjustment functions to permit the driver to selectively focus alternately to his eyes the images of different light intensities of the limited common field view as indicated by in various rays in Fig. 3, namely, R, S, and T, where the image is incident as light upon the mirror as shown by line $p$. By properly tilting the mirror, the lines R, S, and T may be selectively brought to the level of the driver's eyes so that he will see the image from the front mirror reflective film means $c$ or the image from the rear reflective film means $b$ as modified by the light transmission of the front mirror reflective means, or a multiple reflected image arising from internal reflections within the prism form.

As pointed out above, the mirror device may be employed with the narrow end of the prism $a$ either up or down. Thus, Figs. 4, 5 and 6 more clearly bring out how the various reflected beams originate and are separated and how the selective stepwise tilting or angular adjustment of the prism form operates to focus the various reflection beams when the mirror is used with its narrow end up. As shown in these figures, the light incident upon the mirror device, originating from the object I, is reflected as the several image beams 1, 2 and 3. In each of the figures beam 1 is a reflection directly from the front mirror means. This is shown as reflected to the driver's eyes in Fig. 4, but in Figs. 5 and 6 it is reflected into the car above the driver's eyes and is not visible to him. The beams 2 and 3 in Fig. 4 are reflected below the driver's eyes so that he sees the reflected beam 1 only.

Figure 4:
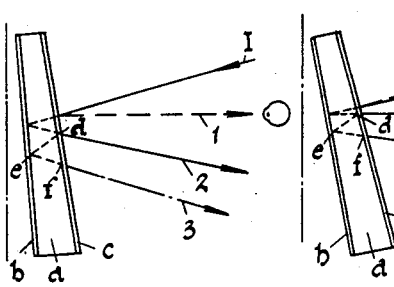
Fig. 4 is a diagrammatic view of the mirror showing how it provides a reflected image from the front mirror surface visible to the driver at the point shown.
Figure 5:
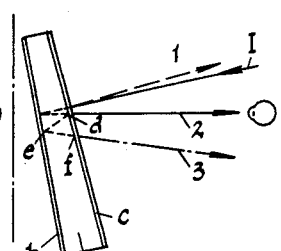
Fig. 5 is a similar view showing how a reflected image visible to the driver is formed by reflection of light from the rear mirror surface.
Figure 6:
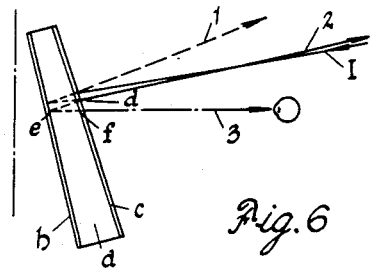
Fig. 6 is a further similar view showing how a third reflected image is formed by reflection from the rear mirror surface by internal reflection within the prism formed by cooperating reflection from the front mirror surface.

In Fig. 5 the reflected beam 2 alone reaches the driver's eyes, and in Fig. 6 the mirror device has been shifted angularly further to bring reflected beam 3 into the driver's eyes. In Fig. 5 this same beam 3 is below the normal line of sight of the driver. The selective shifting indicated in Fig. 6 brings beam 3 only into the driver's eyes, and brings the other reflected beams 1 and 2 out of line with the driver's eyes and reflects the same into the top of the car. The vertical line appearing in each of Figs. 4, 5 and 6 serves to indicate a relative degree of angular shifting of the prism form in those figures.

It will be noted in Figs. 4, 5 and 6 that the reflected beam 1 originates by reflection from the front mirror means c, while the reflected beam 2 results from the first reflection from the rear mirror means b. Such latter beam, however, passes through the front mirror means c twice and is modified by the light transmission of such front mirror means. The incident light is decreased in intensity by the light reflection properties of the front mirror means c primarily, the absorption of reflective means c being substantially negligible. Thus, the incident light is reduced by the reflection of beam 1 so that not all the incident light reaches the rear reflective means b. The reflection ability of the rear reflective means b then determines the amount of light returned forwardly, but before the reflected beam issues from the prism form a further reflection occurs at point d by the front mirror means. Thus, the beam 2 is of a reduced intensity as compared to the incident beam.

The origin of beam 3 will be seen to be by internal reflection within the prism form by the cooperative action of the front mirror means and of the rear mirror reflective means. Thus, the incident beam after reduction in intensity by light reflected as ray 1 by the front mirror means c passes to the rear mirror reflective means and is reflected back therefrom. As just explained above, this reflected ray passes out of the mirror as beam 2 but in doing so is subject to partial reflection at point d by the front mirror means. Thus, the incident light is further reduced by the loss of ray 2 before the internally reflected light arrives back at the rear mirror reflective means again and is reflected again at point e. Such reflection again exerts a reduction in intensity, and a further reduction in light intensity of the beam 3 occurs as some light is again reflected at point f as the beam passes through the front mirror means.

The ball 15 of mounting 16 extends through an opening 20 in the case 10 and is mounted in a spherical seat or bearing 21 formed in the liner plate 12 in alignment with opening 20. The ball is held in its seat by a metal strap 22 having a central bearing portion 23 conforming to and engaging the ball and secured at its opposite ends to the liner plate as indicated at 24 and 25.

Extending rearwardly from the flattened side of the truncated ball 15 is a reduced stem 26 integral with the cylindrical arm 17 of tiltable mounting 16. The arm 17 is formed at its opposite end with a flattened head 27 which is vertically disposed and located intermediate the opposite sides of the arm to provide the arcuately curved end edges 28 and 29. The head 27 is provided centrally thereof with an opening 30 for the pivot pin 19. Formed integral with the head 27 is a finger 31 which is eccentric to the longitudinal axis of the arm 17 and has the forwardly converging upper and lower surfaces 32 and 33 terminating in relatively sharp edges 34 and 35 spaced from one another by a small V-shaped notch 36.

The arm 18 is also preferably cylindrical and is provided with an axial chamber 37 closed at one end and open at its opposite end. Extending forwardly from the open end of the chamber are the spaced parallel ears 38 and 39 which are disposed at opposite sides of the head 27 and have openings 40 which register with the opening 30 in said head to also receive the pivot pin 19 therethrough whereby the arms 17 and 18 are hingedly connected together. The forward end edges 41 and 42 of ears 38 and 39 are curved to correspond to the curvature of the end edges 28 and 29 of arm 17 to facilitate the desired swinging movement of the arm 17 relative to arm 18.

Freely mounted within the chamber 37 is a spring actuated snap lock comprising a locking ball 43 backed by a coil spring 44 which normally urges the ball 43 toward and maintains it in engagement with the finger 31. The arm 18 terminates at its rear end in a threaded stud or the like 45 by which the mounting may be fixedly secured in position in the automobile, although other types of securing means may of course be provided. In order to prevent any undesirable play or vibration between the arms 17 and 18, there may be provided a metal washer 46 carried by the pivot pin 19 and positioned between the head 27 and one of the ears 38 or 39 of arm 18.

The finger 31 extends into the chamber 37 and is slightly narrower, in its direction of rotation, than the diameter of said chamber so that a limited play is provided between said finger and the internal wall of the chamber. This permits the required movement of the arm 17 through a predetermined arc necessary to bring any one of the three images of different intensities into the normal line of vision of the driver. The wall of the chamber 37, which is engageable by the upper or lower edge of the finger 31 depending upon the direction of movement of the arm 17, provides a positive stop for limiting the movement thereof.

When the mirror is tilted upwardly or downwardly to obtain the desired image intensity, the ball 43 and spring 44, coacting with finger 31, function to effectively lock the mirror in place in any one of three positions to obtain the desired image intensity and thereby insure maintenance of the proper set position thereof. Thus, when the mirror is tilted downwardly to its extreme lower position as indicated by broken lines g in Fig. 7, the finger 31 will be moved upwardly to engage the wall of the chamber 37 and thereby limit the movement of the mirror. At the same time, the edge 35 of finger 31 will move slightly beyond the center point of the ball 43 whereupon the spring 44 will urge the ball forwardly and maintain it in firm engagement with the surface 33 of the finger and thereby lock the mirror in set position. When in such position, the image beam 1 will be reflected to the driver's eyes as shown in Fig. 4.

When the mirror is tilted upwardly to its extreme upper position, as indicated in broken lines h in Fig. 7, the finger 31 will be moved downwardly with the extent of its movement being limited by the wall of chamber 37. During such movement, the ball 43 will be temporarily forced rearwardly but as the edge 34 of the finger 31 moves beyond the center of the ball, the said ball will be instantly urged forwardly into engagement with the upper surface 32 of said finger to lock the mirror in position, at which time the image beam 3 will be reflected to the driver's eyes as shown in Fig. 6.

Between its extreme upper and lower positions, the mirror is adapted to assume an intermediate position as shown in full lines in Fig. 7, in which position the image beam 2 will be reflected to the driver's eyes as shown in Fig. 5. When in such position, the mirror will be held in place by the locking ball 43 which is held within the V-shaped notch 36 by the spring 44. At such time, the two edges 34 and 35 of the finger 31 will be at opposite sides of the center of the ball 43.

From the above, it will be seen that upon tilting of the mirror first in one direction and then the other, the ball 43 being constantly held in engagement with the finger 31 by spring 44 will instantly snap into engagement with the respective surface 32 or 33 directly behind the edges 34 or 35 when the finger 31 reaches its extreme upper or lower position and will also snap into the V-shaped notch 36 between edges 34 and 35 as the finger passes between its upper and lower positions. Thus, there is provided a spring actuated snap lock with the ball 43 snapping into place alternately at opposite sides of the finger 31 and in the notch 36 as the mirror is tilted upwardly or downwardly to hold the mirror in selected set position. To facilitate the desired tilting of the mirror, there is preferably provided a handle 47 secured to the arm 17 and depending therefrom so that it is within easy reach of the driver. In effecting step by step adjustment of the mirror, it is only necessary for the driver to flip the handle forwardly or rearwardly with the locking of the mirror in desired position being accomplished by the snap locking means.

While the mounting thus provides for adjustment of the mirror to give three different light intensities of images of the rear road and traffic conditions, it will be obvious that all drivers will not necessarily select the same image intensity for driving under similar road and lighting conditions, since each will select an image intensity that best suits his particular eyes under the existing condition. Thus, while the brightest image might generally be used by most drivers during day driving, it would appear that due to the wide difference in human eyes that many drivers in order to avoid day glare would prefer to use in day driving the reflected image from the mirror which falls in the 10% to 30%, approximately, range. With most drivers this range would be used in normal night driving. Further, when driving in daytime under snow glare conditions, it would appear that the driver would use the third image of still further reduced light intensity to offset such glare conditions. Many drivers would also use this third range of image intensity for normal night driving as giving them best glare reduction although such image might more generally be used by a larger group of drivers mainly under intense glare conditions at night due to high intensity lights upon a closely approaching rear car and particularly under the bad glare conditions that occur upon rainy night driving.

In use, the mirror is first adjusted upon the supporting ball 15 to the proper angular position for the driver of the automobile, after which the mirror is tilted upon the horizontal axis defined by the pivot pin 19 to selectively bring any one of the light beams 1, 2 or 3 to the driver's eyes. The tilting of the mirror can be easily and quickly effected by movement of the handle 47 in the proper direction with the exercise of little or no care or attention on the part of the driver, since the novel mounting herein provided will not only limit movement of the mirror to either of its extreme positions, but will also effectively lock it in such position as well as in its intermediate position. Likewise, the tilting of the mirror will in no way affect the adjustment of the mirror on the ball 15 to suit the particular driver. The strength of the spring 44 is such that it will hold the mirror firmly in selected position. Nevertheless, relatively little pressure is required to tilt the mirror against the action of the spring pressed ball. As soon as either edge 34 or 35 of the finger has passed the center line of the spring pressed ball, the ball will actually assist the tilting movement and literally snap the finger into place. It is only necessary that the driver swing the mirror upwardly or downwardly and the mounting will automatically function to limit the movement of the mirror when it reaches the desired selected position and insure its maintenance in such position until again changed by the driver.

For my back mirror reflective means or coating b I have found that any material having a high specular reflectivity of 50% to 95% or more may be used. Thus, silver and aluminum of 90% reflectivity are found to be excellent for this purpose. By coating aluminum with a quarter wave length thickness coating of a low index material such as magnesium fluoride and a further quarter wave length thickness of a high index material such as zinc sulfide or titanium dioxide, a multiple coating showing 95% or greater reflectivity may be secured and such a multiple coating may be used as a rear reflective means in my mirrors with advantage as higher reflectivity in the rear reflective means increases generally the brightness of the second, third, and further images. I may also use magnesium, having a reflectivity of 73%; platinum having a reflectivity of 63%; iron having a reflectivity of 55%; chromium having a reflectivity of 55%; nickel having a reflectivity of 60%; and rhodium having a reflectivity of 75%. I may use other materials such as cobalt, iridium, indium, antimony, molybdenum, palladium, cadmium, and other silvery appearing metals.

I may also use for my back reflective means or mirror coating b colored reflectors, such as gold of 60% to 80% reflectivity, or copper of 55% to 75% reflectivity. I may secure such variations in reflectivity value with these or the other metals already given by varying the thickness of such metallic film. I may choose to use a thin film of partially transparent gold backed by an opaque silver mirror. Further, I may also use semi-transparent reflective layers, as the mirror film b, which are colored by light interference effects as disclosed in the copending applications of William H. Cobert and Willard L. Morgan, Serial No. 473,473, filed January 25, 1943, now Patent No. 2,430,452, issued November 11, 1947; Serial No. 646,876, filed February 11, 1946, now Patent No. 2,519,546, issued August 22, 1950; Serial No. 646,875, filed February 11, 1946, now Patent No. 2,519,545, issued August 22, 1950, and as disclosed in U. S. Patent No. 2,394,533.

The use of a colored reflective rear surface reflective mirror means or coating b does not of course give any coloration to the front mirror reflection, but does control the color of the reflecting mirror means b. The color of the mirror image reflections coming from within the prism form and the general reflectivity intensity of such reflections may also be colored and affected by the use of a colored prim or of colored glass plates. Also, if the front surface mirror film c is colored by selective reflection or by interference effects, not only is the reflection from this surface colored but a color is imparted to the mirror reflection from film b, also by reason of the selective colored light transmission of this semi-transparent coating e. Thus, my mirror may not only give colored reflections but the several reflections in the different positions of use do not of necessity appear of similar color but are frequently of different colors as well as of different reflectivities.

I have found that only certain materials may be used in forming the semi-transparent reflective coatings employed in forming the front reflective means. Any absorption of light by these coatings so reduces the light available for forming the desired third and further images that any such images thus formed are of so greatly reduced light intensity that they produce relatively useless reflections of too low or no visibility. I have found that these coatings must be substantially without any light absorption, certainly any coating or group of coatings employed in the front reflective means must not have a light absorption of over 5% total. Thus, the light transmission of such coatings is largely determined by the amount of incident light not directly reflected by such coating or front reflective means.

As suitable materials for the reflective coatings employed in forming the front reflective means, I may use, by way of example, a semi-transparent substantially non-light absorptive reflecting coating or coating means of or including as a layer a metallic oxide such as titanium dioxide, antimony tetraoxide or pentaoxide, chromium sesquioxide, zirconium dioxide, tungsten trioxide, aluminum sesquioxide, beryllium oxide, stannic oxide, or magnesium aluminate or spinel. There may also be used zirconium silicate or zircon. Such materials may be employed directly as single or as multiple coatings as is necessary to provide sufficient reflectivity as hereafter shown. The reflective properties of such coatings vary with the thickness of such coatings and also vary further as light interference effects occur as the thickness is varied. In multiple coatings which operate to give high reflectivity, I may also use low refractive index materials in combination with layers of other higher index materials, such suitable low index materials being magnesium fluoride, magnesium aluminum fluoride or cryolite, calcium fluoride, lithium fluoride, or silicon dioxide.

Preferably, these reflective coatings for the front reflective means are formed by thermal evaporation within a vacuum, although other methods of deposition may be used, and preferably after the coatings of metallic oxide nature are deposited they are subjected to a heat treatment and oxidation as described in a patent application of A. B. Weinrich, Serial No. 783,841, filed November 3, 1947, now Patent 2,578,956, issued December 18, 1951, in which the thermally evaporated coatings are heated in an oxygen containing atmosphere to reduce the light absorption of the thermally evaporated coating to a minimum. Coatings of the above metallic oxide materials may thus be prepared of less than 2% light absorption and generally of less than 1%. By thermal evaporation alone, coatings of less than 5% light absorption may be prepared in certain cases.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a multiple position rear view vehicular mirror, a pair of supporting arms arranged end to end and pivotally connected together at their adjacent ends for movement relative to one another about a substantially horizontal axis, one of said arms adapted to be fixedly secured to a rigid part of the vehicle, a mirror carried by the other arm and movable relative to said first arm about said axis to produce three separate individual images of different light intensities, each of which images is selectively movable into the driver's field of vision by tilting of said mirror, one of said arms being provided with an axial chamber and the other with a finger extending into the open end of said chamber and terminating in spaced, relatively sharp edges, a locking ball in said chamber, and a spring in back of said ball for constantly urging it toward the finger and for maintaining said ball in yieldable engagement with said finger either outwardly of said relatively sharp edges or between said edges upon angular adjustment of the movable arm and mirror carried thereby to maintain the mirror in any one of the three selected angular positions.

2. In a multiple position rear view vehicular mirror, a pair of supporting arms arranged end to end and pivotally connected together at their adjacent ends for movement relative to one another about a substantially horizontal axis, one of said arms adapted to be fixedly secured to a rigid part of the vehicle, a mirror carried by the other arm and movable relative to said first arm about said axis to produce three separate individual images of different light intensities, each of which images is selectively movable into the driver's field of vision by tilting of said mirror, the first arm being provided with an axial chamber open at its inner end and terminating in a pair of spaced ears, a flattened head provided at the adjacent end of the second arm and received between said ears, a horizontal pivot pin passing through said ears and head, said head being formed with a finger extending into the open end of said chamber and terminating in a pair of relatively sharp edges spaced in the direction of rotation of said second arm, a locking ball freely mounted in said chamber, and a spring also in said chamber maintaining the ball in yieldable engagement with the finger, said finger being relatively narrower than the diameter of the chamber in the direction of rotation of said second arm to provide for movement of the finger within said chamber to bring both relatively sharp edges thereof to a position at either side of the center of the ball or at opposite sides of the said center to maintain the mirror in any one of the three selected angular positions.

3. In a multiple position rear view vehicular mirror, a pair of supporting arms arranged end to end and pivotally connected together at their adjacent ends for movement relative to one another about a substantially horizontal axis, one of said arms adapted to be fixedly secured to a rigid part of the vehicle, a mirror carried by the other arm and movable relative to said first arm about said axis to produce three separate individual images of different light intensities, each of which images is selectively movable into the driver's field of vision by tilting of said mirror, the first arm being provided with an axial chamber open at its inner end and terminating in a pair of spaced ears, a flattened head provided at the adjacent end of the second arm and received between said ears, a horizontal pivot pin passing through said ears and head, said head being formed with a finger extending into the open end of said chamber and terminating in a pair of relatively sharp edges spaced from one another by a substantially V-shaped notch, the movement of said second arm being limited by engagement of said finger with the wall of said chamber, a locking ball freely mounted in said chamber, and a spring also in said chamber maintaining the ball in yieldable engagement with the finger, said finger being relatively narrower than the diameter of the chamber in the direction of rotation of said second arm to provide for movement of the finger within said chamber to bring the locking ball either within the V-shaped notch or to either side of said notch adjacent the relatively sharp edges of the finger to maintain the mirror in any one of the three selected angular positions.

DWIGHT WILSON BARKLEY.

REFERENCES CITED

The following references are of record in the file of this patent:

UNITED STATES PATENTS

| Number | Name | Date |
|---|---|---|
| 718,309 | Brown | Jan. 13, 1903 |
| 1,517,009 | Kniffen | Nov. 25, 1924 |
| 1,777,520 | Gillespie | Oct. 7, 1930 |
| 2,325,615 | La Hodny et al. | Aug. 3, 1943 |
| 2,397,947 | Colbert | Apr. 9, 1946 |
| 2,420,259 | McNamara | May 6, 1947 |
| 2,455,818 | Sherts | Dec. 7, 1948 |

FOREIGN PATENTS

| Number | Country | Date |
|---|---|---|
| 3,276 | Great Britain | July 26, 1881 |
| 362,622 | Great Britain | Dec. 10, 1931 |